Jan. 15, 1935. G. S. SCOTT 1,987,713
REEL
Filed Nov. 13, 1933
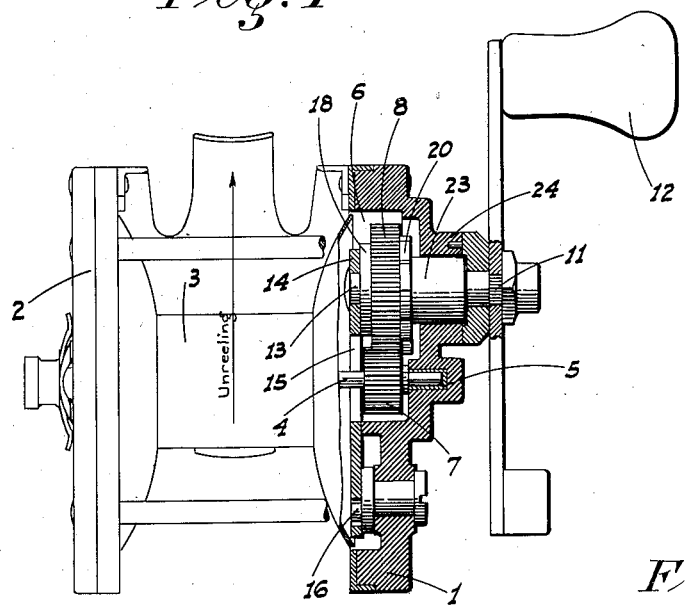
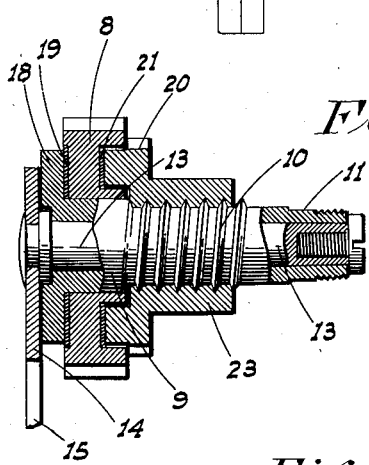
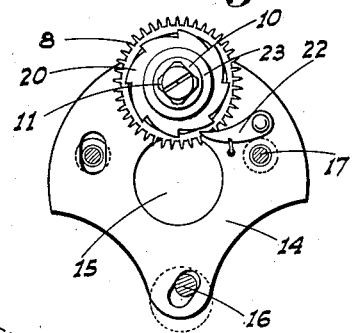
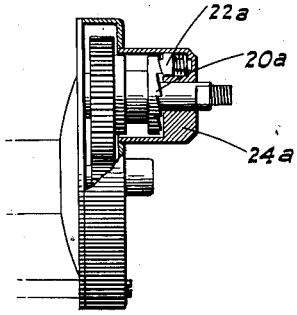
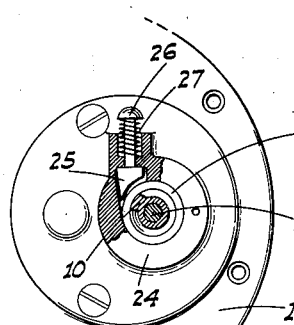
INVENTOR
G. S. Scott
BY
ATTORNEY Patented Jan. 15, 1935

1,987,713

UNITED STATES PATENT OFFICE 1,987,713

REEL

George S. Scott, Fresno, Calif.

Application November 13, 1933, Serial No. 697,779

13 Claims. (Cl. 242—84.5)

This invention relates to fishing reels, my principal object being to provide a reel of this general character so constructed that with the manipulation of the reel handle in one direction, the reel may be gradually and evenly braked against free rotation to any desired extent or rotated in a line winding direction. Also, upon the holding or winding pressure of the handle being merely released, a pull on the line—as by a fish—will instantly and automatically cause the line and reel to run free. In this manner the movement of the reel necessary in the playing and reeling in of a fish pulling on the line and tending to unwind the same from the reel, may be accurately and easily controlled with one hand.

I have also provided a separate but easily operated means to lock the mechanism with any desired degree of braking pressure, without relying on the handle pressure, while at the same time said means is instantly and automatically released by the reel winding action of the handle or when it is desired to allow the line to run free.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a plan view of one form of the reel, the head in which the control mechanism is mounted being shown in section.

Figure 2 is an enlarged section of the clutch or reel control unit detached.

Figure 3 is a face view of said unit.

Figure 4 is a fragmentary exterior view of the head of the reel partly broken out showing the brake locking device.

Figure 5 is a fragmentary sectional plan of a modified form of control mechanism.

Referring now more particularly to the characters of reference on the drawing, and particularly at present to Figures 1 to 4, the reel comprises a pair of transversely spaced heads 1 and 2 connected together in the usual manner and between which the reel spool 3 is disposed. The spindle 4 of the spool is turnably mounted in the head 2 in the customary manner, which it is not necessary to disclose, and its opposite end is journaled in a bearing bushing 5 in the head 1 in which the novel control mechanism is mounted.

Said head 1 between its outer face and the adjacent end of the spool is formed with a hollow chamber 6 into which projects a pinion 7 fixed on the spindle 4 adjacent the bearing 5. This pinion engages a gear 8 also disposed within the chamber 6.

The gear is turnably and slidably mounted on the adjacent portion of a sleeve 9 which outwardly of said gear is provided with left hand threads 10 for a certain portion of its length. Beyond the threaded portion the sleeve projects clear of the head and has a reduced portion 11 arranged to non-turnably project into the operating crank handle 12 of conventional form. The sleeve 9 is turnably mounted on a spindle 13 which at its inner end is rigidly fixed on a plate 14 secured to the head 1 inwardly of the chamber 6, said plate having an opening 15 through which the pinion projects. This arrangement provides a long bearing for the sleeve preventing any tendency to binding and allowing the same absolute freedom of rotation.

Since the pinion which meshes with the gear is mounted directly in the head, while the gear itself is mounted on the separate plate 14, I have provided an adjustment for said plate to facilitate assembling operations. This is preferably in the form of an eccentric pin 16 engaging said plate and operable from the outer face of the head, so that said plate may be shifted about one of the holding screws 17 as an axis and thus enable the gear to be shifted as may be necessary to cause the same to properly mesh with the pinion.

The sleeve 9 behind the gear is formed with a disk 18, there being a friction washer 19 between said disk and the adjacent face of the gear. Threaded on the screw 10 is a combination ratchet and friction wheel 20 disposed adjacent the outer face of the gear, there being a friction washer 21 between said wheel and said face of the gear. A dog 22 is pivoted on the plate 14 to engage the teeth of the wheel, said teeth being arranged to prevent rotation of the wheel in an advancing direction relative to the threads except for the arcuate amount between adjacent ratch teeth.

The hub 23 of the ratchet wheel projects into a recess in a boss 24 formed with and projecting outwardly from the head 1, said hub approaching close to the bottom of the recess so that the axial movement of said hub along the screw sleeve is so limited that there will always be slight friction between the washer 21 and the adjacent face of the gear and ratchet wheel.

By means of this structure it will be seen that when the handle 12 is turned slightly in a clockwise direction, the screw sleeve will be rotated also. This causes the friction ratchet wheel by reason of its natural slight contact with the washer 21, to be advanced along said sleeve to firmly engage said washer, and to clamp the same between the gear and wheel with a pressure depending on the amount of turning of the handle. At the same time the gear is forced along the sleeve so that the back friction washer 19 is clamped between the gear and the disk 18 with a corresponding pressure. Unwinding rotation of the spool, as when a fish is pulling on the line, is therefore restrained by the braking pressure thus applied to the gear, which is engaged with the pull pinion. Such braking pressure will be retained as long as the sleeve is held in position to which it has been moved. Further rotation of the handle in the same direction further advances the friction wheel along the sleeve so that the gear is clamped thereto in positive non-slipping relation, allowing the line to be wound onto the reel regardless of a pull of a fish thereon.

Any time it is desired to free the spool, it is only necessary to remove the holding or rotating pressure from the handle. A pull on the line tending to rotate the spool in the opposite direction, is imparted to the gear 8 and the screw sleeve which are locked together and consequently rotate for an instant as a unit. The dog 22 engages the ratchet wheel preventing rotation of the latter with the screw sleeve for more than a very short arcuate distance and as a result said wheel is held against rotation and backs away from the gear. This releases the heavy frictional contact and allows said gear and consequently the spool to run free.

If desired I may lock the sprocket wheel in any braking position without maintaining a pressure on the handle. This is done by mounting a wedge shaped brake element 25 in the boss 24 to engage the hub 23 tangentially. This element is pressed into braking engagement by a finger stem 26, while a spring 27 tends to release the element. Said element is positioned on that side of the hub which causes the same to be automatically released, aided by the spring, with the rotation of the crank handle in a line winding direction. This device by holding the friction wheel hub against either axial or rotative movement, holds the wheel against the gear with whatever frictional pressure has been attained by operation of the handle.

In Figure 5 the general structure and operation are the same as above described. The ratchet teeth of the friction wheel 20a however are on the outer face of the wheel instead of on the periphery, and the dog 22a to engage said teeth is mounted in the bottom of the head boss 24a for axial movement parallel to the axis of the ratchet wheel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A fishing reel comprising side heads, a reel-spool disposed between and turnably mounted on said heads, a pinion fixed with the spool axially thereof, a gear meshing with the pinion, said pinion and gear projecting into one head, a sleeve on which said gear is freely turnable, means turnably mounting said sleeve in said head, a handle connected to the sleeve, threads on said sleeve, and a friction member to cooperate with one face of the gear mounted on the threaded portion of the sleeve and normally in slight contact with said gear; the threads being cut on a pitch relative to the direction of line winding rotation of the sleeve so that with such rotation, the member will be advanced against the gear to first engage the same with a braking pressure and then with a locking pressure to cause said member, the gear and sleeve to turn as a unit.

2. A structure as in claim 1, with means to hold said member against rotation in the direction opposite to a line winding rotation of the gear and sleeve.

3. A structure as in claim 1, with cooperating friction surfaces between the opposite face of the gear and the adjacent portion of the sleeve, said gear being slidable along the sleeve, and means to hold said friction member against rotation in the direction of rotation of the gear in a line unwinding direction beyond a limited arcuate movement.

4. A structure as in claim 1, said member having a hub, and hand actuated means mounted in said head to the hub to engage and hold said hub against rotation and axial movement.

5. A fishing reel comprising the combination with side heads and a reel spool rotatable between the same, of a driving means for the spool comprising a spindle mounted on one head, a sleeve turnable on the spindle and held against movement axially thereof, a gear mounted for free turning movement on the sleeve and connected in driving relation with the spool, left hand threads on the sleeve beyond the gear, and a friction wheel mounted on the threads and adapted to be moved axially along the threads into frictional contact with the face of the gear when the sleeve is turned in a clockwise direction.

6. A fishing reel comprising the combination with side heads and a reel spool rotatable between the same, of a driving means for the spool comprising a spindle mounted on one head, a sleeve turnable on the spindle and held against movement axially thereof, a gear mounted for free turning movement on the sleeve and connected in driving relation with the spool, left hand threads on the sleeve beyond the gear, a friction wheel mounted on the threads and adapted to be moved axially along the threads into frictional contact with the face of the gear when the sleeve is turned in a clockwise direction, and means to so limit the movement of the friction wheel along the sleeve as to maintain a constant slight friction between the faces of the wheel and gear.

7. A fishing reel comprising the combination with side heads and a reel spool rotatable between the same, of a driving means for the spool comprising a spindle mounted on one head, a sleeve turnable on the spindle and held against movement axially thereof, a gear mounted for free turning movement on the sleeve and connected in driving relation with the spool, left hand threads on the sleeve beyond the gear, a friction wheel mounted on the threads and adapted to be moved axially along the threads into frictional contact with the face of the gear when the sleeve is turned in a clockwise direction, and means to set the friction wheel in any position to which it may be moved.

8. A fishing reel comprising the combination with side heads and a reel spool rotatable between the same, of a driving means for the spool comprising a spindle mounted on one head, a sleeve turnable on the spindle and held against movement axially thereof, a gear mounted for free turning movement on the sleeve and connected in driving relation with the spool, left hand threads on the sleeve beyond the gear, a friction wheel mounted on the threads and adapted to be moved axially along the threads into frictional contact with the face of the gear when the sleeve is turned in a clockwise direction, and means to set the friction wheel in any position to which it may be moved, such means comprising a housing supported from one head, a hub on the wheel movable in said housing, and a wedge pressable between the housing and hub.

9. A fishing reel comprising the combination with side heads and a reel spool rotatable between the same, of a driving means for the spool comprising a spindle mounted on one head, a sleeve turnable on the spindle and held against movement axially thereof, a gear mounted for free turning movement on the sleeve and connected in driving relation with the spool, left hand threads on the sleeve beyond the gear, a friction wheel mounted on the threads and adapted to be moved axially along the threads into frictional contact with the face of the gear when the sleeve is turned in a clockwise direction, and means to set the friction wheel in any position to which it may be moved, such means comprising a housing supported from one head, a hub on the wheel movable in said housing, and a wedge pressable between the housing and hub, with means to retract the wedge from wedging position.

10. A fishing reel comprising the combination with side heads and a reel spool rotatable between the same, of a driving means for the spool comprising a spindle mounted on one head, a sleeve turnable on the spindle and held against movement axially thereof, a gear mounted for free turning movement on the sleeve and connected in driving relation with the spool, left hand threads on the sleeve beyond the gear, a friction wheel mounted on the threads and adapted to be moved axially along the threads into frictional contact with the face of the gear when the sleeve is turned in a clockwise direction, and means to permit only a limited arcuate movement of the friction wheel in a counter clockwise direction.

11. A fishing reel comprising the combination with side heads and a reel spool rotatable between the same, of a driving means for the spool comprising a spindle mounted on one head, a sleeve turnable on the spindle and held against movement axially thereof, a gear mounted for free turning movement on the sleeve and connected in driving relation with the spool, left hand threads on the sleeve beyond the gear, a friction wheel mounted on the threads and adapted to be moved axially along the threads into frictional contact with the face of the gear when the sleeve is turned in a clockwise direction, a ratchet on the wheel, and a dog supported from one head and engageable with the ratchet and formed to permit rotation of the wheel in a counter clockwise direction only through the arcuate limits of one ratchet tooth.

12. A fishing reel comprising the combination with side heads and a reel spool rotatable between the heads, a gear mounted in driving relation with the head, an operating handle turnably supported from one head, means between the handle and gear and functioning with the turning of the handle in a line winding direction to apply a gradually increasing braking action on the gear up to such a point as to cause the gear to positively turn with the handle, and means operable independently of the handle to hold the gear in any braked position at which it may have been initially set by operation of the handle.

13. A fishing reel comprising the combination with side heads and a reel spool rotatable between the heads, a gear mounted in driving relation with the head, an operating handle turnably supported from one head, means between the handle and gear and functioning with the turning of the handle in a line winding direction to apply a gradually increasing braking action on the gear up to such a point as to cause the gear to positively turn with the handle, means operable independently of the handle to hold the gear in any braked position at which it may have been initially set by the operator, such means being releasable with a further movement of the handle.

GEORGE S. SCOTT.